United States Patent

Na et al.

[11] Patent Number: 5,920,551
[45] Date of Patent: *Jul. 6, 1999

[54] CHANNEL STRUCTURE WITH BURST PILOT IN REVERSE LINK

[75] Inventors: JongRay Na; Hun Lee; YangGi Kang; HoonBok Lee; HyoungGoo Jeon, all of Daejeon, Rep. of Korea

[73] Assignee: Electronics and Telecommunications Research Institute, Daejeon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/638,130

[22] Filed: Apr. 26, 1996

[30] Foreign Application Priority Data

Jun. 23, 1995 [KR] Rep. of Korea ............... 95-17184

[51] Int. Cl.$^6$ ...................................... H04J 13/00
[52] U.S. Cl. ........................ 370/335; 370/342; 370/441
[58] Field of Search ..................... 370/282, 315, 370/320, 328, 331, 332, 335, 342, 441, 498, 500, 503, 516, 341; 375/200, 205, 359, 362, 363, 364, 371; 455/450, 63

[56] References Cited

U.S. PATENT DOCUMENTS

| | | |
|---|---|---|
| 5,267,261 | 11/1993 | Blakeney, II et al. ............ 370/332 |
| 5,577,022 | 11/1996 | Padovani et al. ............... 370/332 |
| 5,603,081 | 2/1997 | Raith et al. ................... 455/33.1 |
| 5,802,046 | 9/1998 | Scott ............................ 370/341 |

*Primary Examiner*—Chi H. Pham
*Assistant Examiner*—Ricky Ngo
*Attorney, Agent, or Firm*—Antonelli, Terry, Stout & Kraus, LLP

[57] ABSTRACT

A channel structure for performing a coherent demodulation in reverse links respectively adapted to transmit pilots from a plurality of mobile stations to a base station in a wideband code division multiple access (CDMA) mobile communication system, wherein burst pilots are respectively transmitted from the mobile stations within predetermined time slots so that they can be staggered with reference to the start point of every superframe. Since a pilot burst adjustment is carried out in accordance with the present invention, it is possible to obtain an increased channel capacity as compared to that of the reverse link according to the IS-95 standard scheme. The receiver of the base station can also have a simple and inexpensive structure.

6 Claims, 3 Drawing Sheets

CHANNEL STRUCTURE WITH BURST PILOT IN REVERSE LINK

BACKGROUND OF THE INVENTION

1. Field of the Invention

The present invention relates to a code division multiple access(CDMA) mobile communication system, and more particularly to a channel structure with burst pilots in reverse links of such a CDMA mobile communication system. In other words, the present invention concerns a method for transmitting burst pilots from a plurality of mobile stations to a base station through respective reverse links.

2. Description of the Prior Art

Conventional digital CDMA cellular systems(DCCS's) have forward traffic channels which are classified into four kinds of channels, namely, the pilot, synchronization, paging and traffic channels.

The pilot channel serves to make the mobile station associated therewith catch the timing of the forward CDMA channel. The pilot channel also provides a reference phase for coherent modulation. In order to determine the point in time at which a hand-off occurs, the pilot channel provides means for comparing the signal strength of the associated base station with that of another base station. In addition, the pilot channel performs the transmission of pilot signals which are direct sequence spread spectrum signals continuously transmitted by each CDMA base station without being modulated.

The synchronization channel provides signals synchronous with mobile stations.

The paging channel is a forward control channel. This paging channel is used in transmitting commands for calling mobile stations.

On the other hand, the traffic channel is a channel for transmitting data transmitted from or to the user between the user's mobile station and base station.

The forward link provides a signal being sent from the base station to the mobile station whereas the reverse link means a signal being sent from the mobile station to the base station.

As apparent from the above description, the forward link using the pilot channel utilizes a coherent demodulation receiving system. On the other hand, each base station is concentrated with pilots corresponding in number to the mobile stations associated with the base station through reverse links. For this reason, the reverse links must use a non-coherent demodulation receiving system using no pilot channel in order to avoid an overload caused by pilots as well as co-interference among pilots. If such reverse links use the coherent demodulation receiving system, the base station associated therewith may simultaneously receive pilot and traffic signals respectively transmitted from many reverse links, thereby causing it to overload. In this case, the pilot signals may interfere with one another.

The above-mentioned conventional forward and reverse links have used coherent and non-coherent demodulation receiving systems in accordance with the IS-95 standard scheme (namely, the digital cellular telephone standard scheme for the CDMA system), respectively. According to the IS-95 standard scheme, however, the reverse link has a degraded performance in comparison with the forward link. Furthermore, the reverse link requires a complex receiver construction. In spite of the complex construction, the receiver has a limited channel capacity (36 channels). As a result, the reverse link according to the IS-95 standard scheme involves a limitation on the total number of channels.

Therefore, it is required to provide a reverse link capable of having a channel capacity larger than that according to the IS-95 standard scheme while requiring a simple receiver construction.

Meanwhile, the coherent demodulation receiving system exhibits a superior performance in wideband CDMA personal communication services (PCS) as compared to the non-coherent demodulation receiving system because it uses pilots. This is because the non-coherent demodulation receiving system consumes a larger amount of signal intensity, that is power than the coherent demodulation receiving system to obtain the same voice signal. Accordingly, it is advantageous to use the coherent demodulation receiving system for the wideband CDMA PCS.

This will be described in detail. Forward and reverse links for the wideband CDMA PCS use the coherent demodulation receiving system using pilots. In this case, however, such pilot signals all interfere with other users (namely, mobile stations) even though there is an advantage when it is extracted from the associated reverse link. Therefore, it is necessary to provide a method for transmitting pilot signals through reverse links without interfering with other users.

SUMMARY OF THE INVENTION

The present invention is proposed in accordance with the CDMA PCS Standard.

In accordance with the present invention, a digital CDMA cellular system with burst pilots (DCCS-BP) in reverse links, which has a simple structure, is proposed.

Therefore, an object of the invention is to provide a channel structure with burst pilots in reverse links of a wideband CDMA mobile communication system capable of not only avoiding an overload concentrated at the base station, but also avoiding signal interference among mobile stations.

"Burst pilots" mean signals respectively output from a plurality of mobile stations to asynchronously transmit burst time information to the same base station.

In accordance with the present invention, the above-mentioned object is accomplished by providing a channel structure for performing coherent demodulation in reverse links respectively adapted to transmit pilots from a plurality of mobile stations to a base station in a wideband CDMA mobile communication system, wherein burst pilots are respectively transmitted from the mobile stations within predetermined time slots so that they can be staggered with reference to the start point of every superframe.

In accordance with the present invention, the mobile stations transmit burst pilots respectively within predetermined time slots with reference to the start point of a superframe transmitted from the base station. Accordingly, it is possible to prevent an overload from concentrating on the base station.

Here, the start point of the superframe is indicative in the point of time when each mobile station transmits a burst pilot.

Also, the start point of the superframe, which is transmitted from the base station, means the point in time when the period of a pseudo noise (PN) sequence is synchronized with the voice frame.

Each time slot is determined in accordance with the channel number allocated to each mobile station by the base station. Thus, mobile stations can transmit burst pilots within different time slots, respectively.

In this case, the mobile stations set different time slot offsets in pilot bursts in order to stagger the pilot bursts.

When the pilot bursts are received at the base station using the timing information from the pilot channels of forward links, the receiving of the pilot bursts can be carried out in a staggered manner by virtue of such different time slot offsets. That is, this method can prevent any interference of pilots by staggering pilot bursts respectively output from mobile stations.

According to the present invention, the pilot burst duration is adjustable. As the pilot burst duration is adjustable, it is possible to obtain an increased channel capacity of the reverse link as compared to that according to the IS-95 standard scheme.

The pilot burst duration is adjustably set in such a manner that it can allow an uncertain tolerance of the round trip delay along the base station-(the forward link)-the mobile station-(the reverse link)-the base station. This pilot burst duration may also be fixedly set to either 10, 20 or 40 modulation symbols (MS).

In accordance with the present invention, the pilot burst duration is also adjustably set only for the extraction of reverse timing signals in order to minimize the interference among continuous traffic channel signals caused by burst pilots.

Accordingly, the present invention achieves easy coherent demodulation even in the receiver of the base station by virtue of burst pilots in the reverse link.

In accordance with the present invention, the reverse traffic channel can perform a continuous signal transfer in parallel to the pilot channel. As a result, it is unnecessary to obtain the continuity of the data receiving and to carry out the multiplexing and demultiplex between pilots and traffic channels.

In addition, since a plurality of mobile stations asynchronously output burst pilots with reference to the start point of the superframe transmitted from the base station, it is possible to prevent the base station from over-loading.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
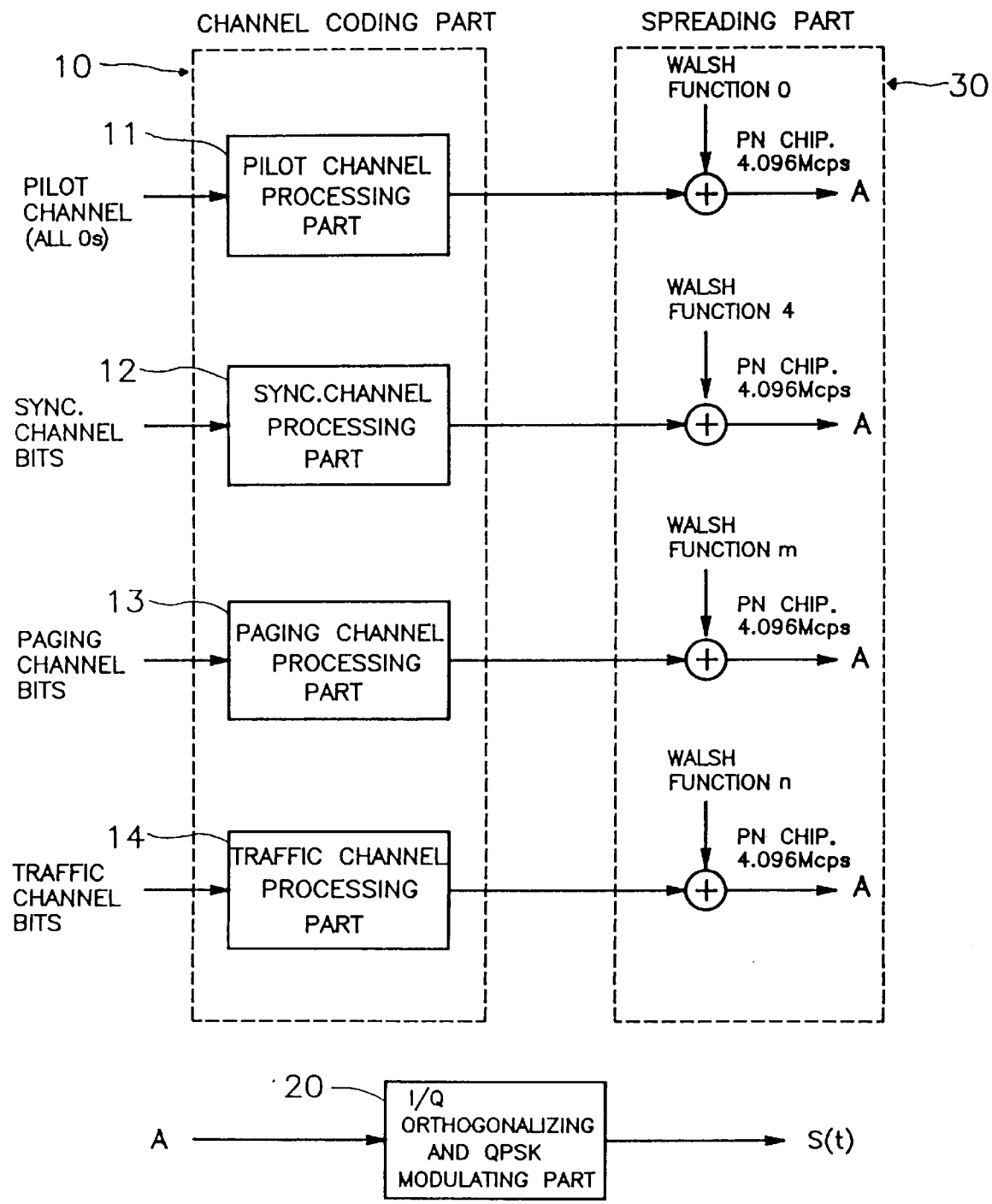
FIG. 1 is a block diagram illustrating a forward traffic channel according to the present invention which consists of pilot, synchronization, paging and traffic channels.

FIG. 1 illustrates the hardware of a forward traffic channel. As shown in FIG. 1, the hardware includes a channel coding part 10, an I/Q orthogonalizing and quadrature phase shift keying (QPSK) modulating part 20 and a spreading part 30.

The channel coding part 10 includes a pilot channel processing part 11, a synchronization channel processing part 12, a paging channel processing part 13 and a traffic channel processing part 14. The pilot channel processing part 11 performs channel coding for pilot channel bits all being 0s, the synchronization channel processing part 12 performs channel coding for synchronization channel bits, the paging channel processing part 13 performs channel coding or paging of channel bits, and the traffic channel processing part 14 performs channel coding for traffic channel bits.

The I/Q orthogonalizing and QPSK modulating part 20 performs an orthogonalization between I and Q channels and a QPSK modulation.

On the other hand, the spreading part 30 serves to spread symbols that are channel-coded in the channel coding part 10 with the Walsh function.

Referring to FIG. 1, bits of each channel are spread by pseudo noise codes, Walsh-covered and then QPSK-modulated.

The transmission rate of the forward traffic channel is typically 32 Kbps for data and 4.8 Kbps for signals.

Where the amount of data being transmitted is small, the transmission rate of the forward traffic channel is variable for every frame of 5 ms. For example, the transmission rate may be 16 Kbps, 8 Kbps or 3.2 Kbps. Otherwise, the transmission rate of the forward traffic channel may be fixed to 64 Kbps for data and 9.6 Kbps for signals.

When the data or signal transmitted through the forward traffic channel passes through a filter serving to perform a transition of the finally spread chip rate to 4.096 Mcps (mega chips per second), it is modulated to be suited for the bandwidth of 5 MHz, that is, the minimum bandwidth allocated to personal communication services (PCS).

Figure 2:
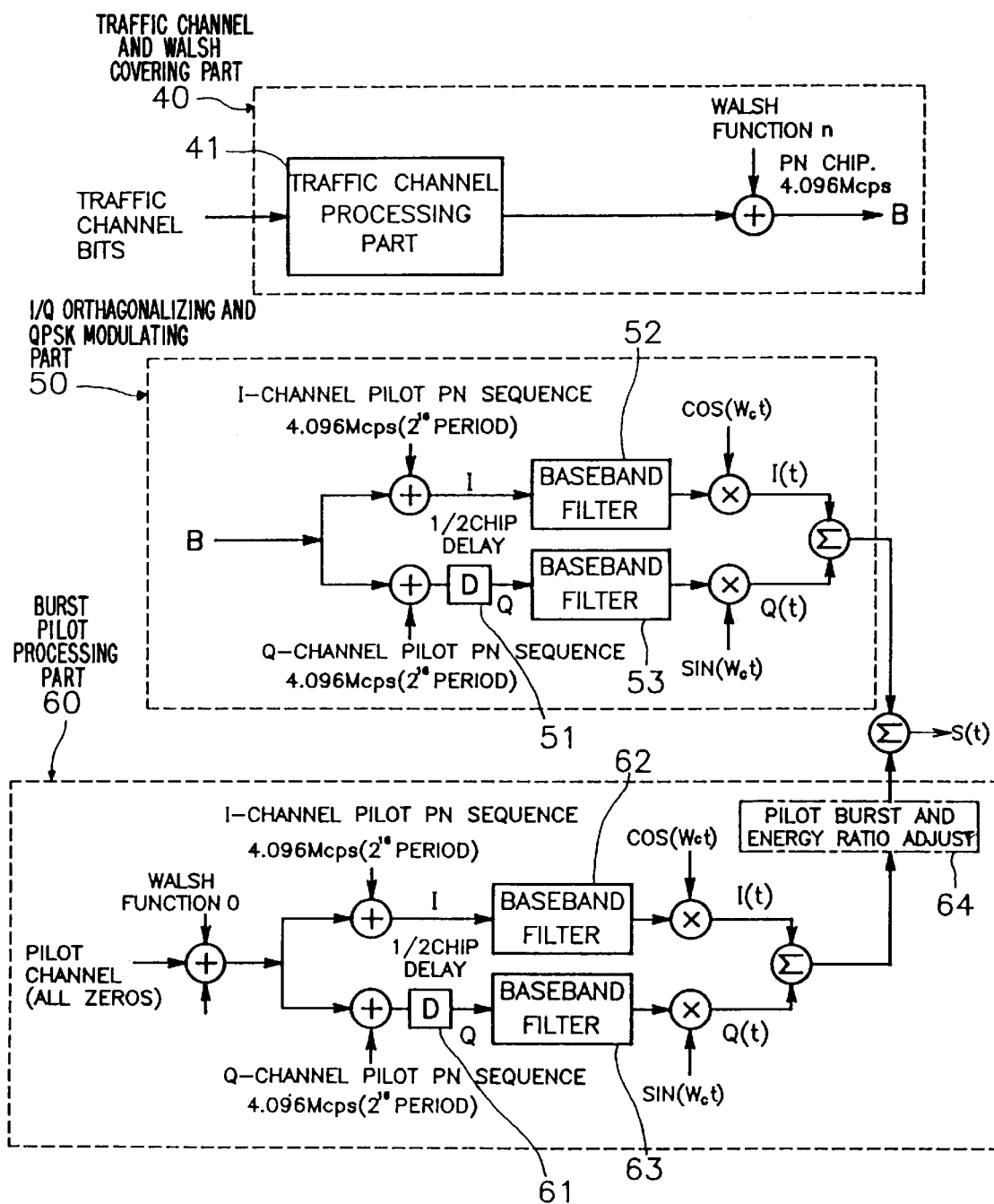
FIG. 2 is a block diagram illustrating a traffic channel with a burst pilot in a reverse link according to the present invention.

FIG. 2 illustrates the hardware of a traffic channel with bust pilots in reverse links.

Although the hardware shown in FIG. 2 includes an access channel, the description of this access channel is omitted because the access channel is similar to the traffic channel. The hardware shown in FIG. 2 will be described in conjunction with the spreading at 4.096 MHz as in the forward link.

As shown in FIG. 2, the hardware includes a traffic channel processing and Walsh covering part 40 having a traffic channel processing part 41. In the traffic channel processing and Walsh covering part 40, the traffic channel processing part 41 performs channel coding for traffic channel bits transmitted thereto. Thereafter, the traffic channel processing and Walsh covering part 40 spreads the channel-coded traffic signal by the Walsh function with an offset of n and then Walsh-covers it at a symbol bit rate of 4.096 Mcps.

The Walsh-covered symbols are then received to the I/Q orthogonalizing and QPSK modulating part 50. The QPSK modulation carried out in the I/Q orthogonalizing and QPSK modulating part 50 is the modulation wherein different data sequences are applied to two carriers which have the same frequency while exhibiting a phase difference of 90° therebetween. One input symbol is spread into 4 chips by the I-channel pilot PN sequence and modulo-2 addition, so that it becomes 16,384 Mcps. Simultaneously, the other input symbol is spread into 4 chips by the Q-channel pilot PN sequence and modulo-2 addition, so that it becomes 16,384 Mcps.

In this case, the Q-channel pilot PN sequence is delayed for the half period by the first delay part (D) 51 with reference to the I-channel pilot PN sequence.

The traffic signals spread in accordance with the I- and Q-channel pilot PN sequences pass through baseband filters 52 and 53 and then mix with carrier frequencies of $\cos(w_c t)$ and $\sin(w_c t)$, respectively. The resultant output signals I(t) and Q(t) mix together. The mixed signal is then subjected to the QPSK modulation.

Meanwhile, the burst pilot processing part 60 constitutes the essential part of the system proposed by the present invention. This burst pilot processing part 60 is adapted to add burst pilot channels to the reverse link. That is, pilot channels (both having the offset of 0) are spread by the Walsh function with the offset of 0 in the burst pilot processing part 60.

One pilot channel is spread into 4 chips by the I-channel pilot PN sequence 4.096 Mcps ($2^{16}$ period) and modulo-2 addition, so that it becomes 16,384 Mcps. Simultaneously, the other pilot channel is spread into 4 chips by the Q-channel pilot PN sequence ( 4.096 Mcps ($2^{16}$ period)) and modulo-2 addition, so that it becomes 16,384 Mcps.

In this case, the Q-channel pilot PN sequence is delayed for the half period by the second delay part (D) 61 with reference to the I-channel pilot PN sequence.

Thus, the pilot channels are PN-spread in accordance with the I- and Q-channel pilot PN sequences, respectively. As a result, the pilot channels become I and Q sequences.

The PN-spread pilot channels pass through baseband filters 62 and 63 and then mix with carrier frequencies of $\cos(w_c t)$ and $\sin(w_c t)$, respectively. The resultant output signals I(t) and Q(t) mix together. The mixed signal is then subjected to the QPSK modulation.

The QPSK-modulated pilot symbol is transmitted in the form of a burst pilot by the pilot burst and energy ratio adjusting unit 64. This pilot symbol having the burst form is added to the symbol output from the I/Q orthogonalizing and QPSK modulating part 50. In this case, the I- and Q-channels are covered by the PN sequence with the period of $2^{16}$ chips.

One period of $2^{16}$ chips corresponds to 16 ms whereas one period of 64 Kbps data corresponds to 1,024 MS or 512 Walsh symbols (WS). In other words, 1 WS corresponds to 128 PN chips whereas 1 MS corresponds to 64 PN chips. Where the period of superframes is 80 ms, that is, the least common multiple of 5 ms, which is one period of voice frames, and 16 ms, which is one period of $2^{16}$ chips, in order to achieve a convenience in the clock synchronization, each mobile station has 5 cycles.

The I/Q PN sequences used in the case of FIG. 2 are generated from a modular feedback shift register (MFSR) with the following characteristic equation:

$$P_I = x^{16} + x^{12} + x^3 + 1$$

$$P_Q = x^{16} + x^{13} + x^{12} + x^{11} + x^7 + x^6 + x^3 + 1$$

Once 15 0's are continuously output upon the sequence outputting, they are added with another 0, thereby forming a $2^{16}$ chip. Such a $2^{16}$ chip is repetitively generated with a period of 16 ms. Therefore, the start point of the superframe is set to 80 ms which is the period wherein the period of $2^{16}$ chips for 16 ms can synchronize with the period of voice frames for 5 ms. The start point of the superframe is transmitted from the base station. With reference to the start point of the superframe, each mobile station adjusts the pilot burst offset associated therewith.

Figure 3:
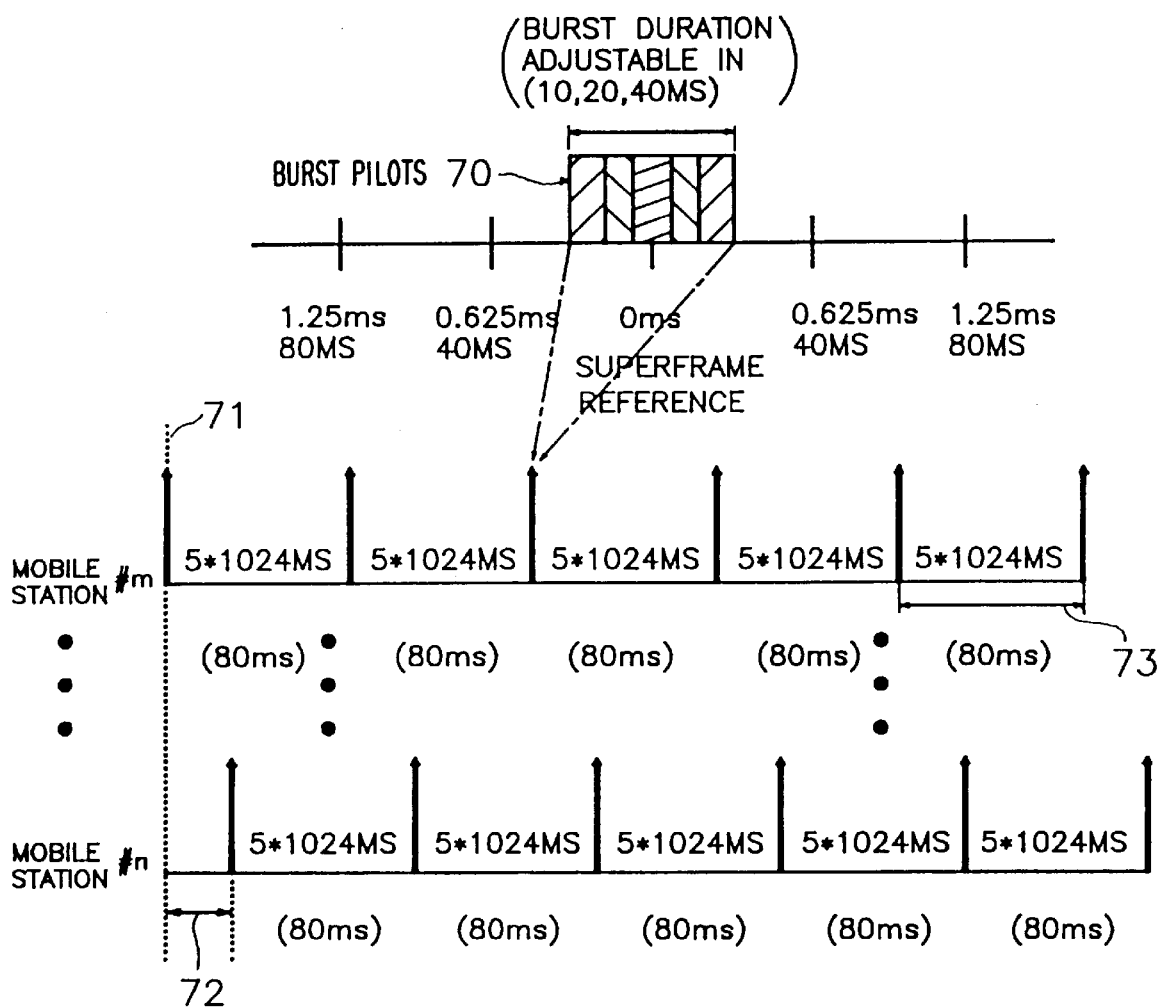
FIG. 3 is a schematic view illustrating burst pilots in the reverse link.

Now, the pilot burst and energy ratio adjusting unit 64 of the burst pilot processing part 60 will be described in detail in conjunction with FIG. 3.

Burst pilots 70 are transmitted from mobile stations #m to #n at intervals of 80 ms, respectively. Each burst pilot has a signal intensity higher than that of the traffic signals in the reverse link by 6 dB so that an easy coherent demodulation can be achieved in the receiver of the base station. Such burst pilots may have a pilot burst duration capable of recording 10, 20 or 40 MS. In other words, the pilot burst duration is adjustably set only for the extraction of reverse timing signals (pilot signals). For example, the pilot burst duration is adjustably set to either 10, 20 or 40 MS. Alternatively, the pilot burst duration may be fixedly set to either 10, 20 or 40 MS.

Accordingly, it is possible to minimize the interference among continuous traffic channel signals caused by burst pilots.

Such burst pilots 70, which have an adjustable pilot burst duration as mentioned above, are transmitted from a plurality of mobile stations to the base station. If some mobile stations output burst pilots at the same time, those burst pilots may to cause a severe interference in the base station. In accordance with the present invention, however, each mobile station has 128 offset slots, 72 which are different from those of other mobile stations with reference to the start point of each superframe transmitted from the base station. Accordingly, it is possible to prevent the base station from being subjected to severe interference. In other words, time slots of mobile stations for outputting burst pilots are different from one another, thereby preventing the burst pilots from concentrating on the base station.

The time slot 73 of each mobile station for transmitting a burst pilot is set by allocating a specific channel number to the mobile station through a corresponding paging channel by the base station.

The number of slots required to stagger burst pilots 70 varies depending on the burst pilot duration. For example, when the burst pilot duration is 40 MS, 128 channels is used to stagger burst pilots (5×1,024 MS÷40 MS=128). When the burst pilot duration is 10 MS, 512 channels are used (5×1,024 MS÷10 MS=512). In this case, one period of burst pilots, which is denoted by the reference numeral 73, is 80 ms.

Thus, pilot bursts output from mobile stations are staggered with one another, thereby preventing pilots from interfering with one another.

In other words, the mobile stations set different time slot offsets in pilot bursts in order to stagger the pilot bursts. When the pilot bursts are received to the base station using the timing information from the pilot channels of forward links, the receiving of the pilot bursts can be carried out in a staggered manner by virtue of such different time slot offsets.

When this method is applied to the base station to manage staggered frames for mobile stations associated therewith, it is possible to manage frames output from a vocoder at intervals of 5 ms and pilot burst frames transmitted at intervals of 80 ms together. In other words, the above method is an offset management method which can be applicable to both the voice frame offset and pilot burst offset when the frame offset value n, which ranges from 0 to 127 (n=0 to 127), is set to a specific value.

The start point of the superframe, which is used to find the start point of the burst pilot transmitted from each mobile station, is determined on the basis of the timing information obtained from the pot channel of the forward link.

In this case, a timing delay is caused by the distance between the base station and mobile station (or terminal). Where the distance is 9.6 Km at the maximum, a timing delay corresponding to 128 chips, namely, 1 WS (=2 MS) is generated. For the mobile station spaced apart from the base station by 19.2 Km, the uncertain tolerance of the round trip delay along the base station-(the forward link)-the mobile station-(the reverse link)-the base station resulting from the distance is 4 MS.

In order to allow such an uncertain tolerance, the adjustable burst duration is sufficiently large. For example, the adjustable burst duration may be 10, 20 or 40 MS. A time slot capable of supporting 128 terminals is also given.

As the mobile stations transmit burst pilots with predetermined time slots in accordance with the present invention, the base station can receive pilots in such a fashion that it receives one pilot. Accordingly, the base station is not subjected to any overload caused by those pilots. The base station can also perform a coherent modulation because the mobile stations send their pilots to the base station, respectively.

As apparent from the above description, the present invention provides the following effects.

First, the present invention achieves an easy coherent demodulation even in the reverse link of the mobile communication system according to the wideband CDMA PCS standard scheme.

Second, since a pilot burst adjustment is carried out in accordance with the present invention, it is possible to obtain an increased channel capacity (55 to 61 channels) as compared to the channel capacity (36 channels) of the reverse link according to the IS-95 standard scheme.

Third, the receiver of the base station can have a simple and inexpensive structure.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile communication system having a channel structure for performing a coherent demodulation in reverse links in a wideband code division multiple access (CDMA) mobile communication system, said mobile communication system comprising:

a plurality of mobile stations which respectively transmit burst pilots, wherein said burst pilots are signals respectively output from said plurality of mobile stations to asynchronously transmit burst time information to a same base station and are transmitted within predetermined time slots so as to be staggered with reference to a start point of respective superframes; and a base station for receiving said burst pilot, wherein said burst pilots have a pilot burst duration which is adjustable to allow an uncertain tolerance of said burst pilots.

2. The mobile communication system in accordance with claim 1, wherein said pilot burst duration is fixed to any of 10, 20 or 40 modulation symbols (MS).

3. The mobile communication system in accordance with claim 1, wherein said pilot burst duration is adjustable to any of 10, 20 or 40 modulation symbols (MS).

4. A mobile communication system having a channel structure for performing coherent demodulation in reverse links in a code division multiple access (CDMA) mobile communication system, said mobile communication system comprising:

means for generating burst pilots, wherein said burst pilots are generated from all-zeroes pilots channel data by PN-spreading in accordance with I- and Q-channel pilot PN sequences;

means for providing said burst pilots in burst form; and burst pilot and energy ratio adjusting means for adjusting burst pilot duration.

5. The mobile communication system in accordance with claim 4, further including a plurality of mobile stations which respectively transmit burst pilots, wherein said burst pilots are transmitted from said mobile stations to a base station within predetermined time slots to prevent interference.

6. The mobile communication system in accordance with claim 4, wherein said burst pilots are all-zeroes data in burst form which are spread and modulated by PN-code spreading and a carrier signal, respectively.

* * * * *